No. 719,662. PATENTED FEB. 3, 1903.
E. A. HAWTHORNE.
SUPPORT FOR PHONOGRAPHS, GRAPHOPHONES, &c.
APPLICATION FILED FEB. 8, 1901. RENEWED DEC. 27, 1902.
NO MODEL.
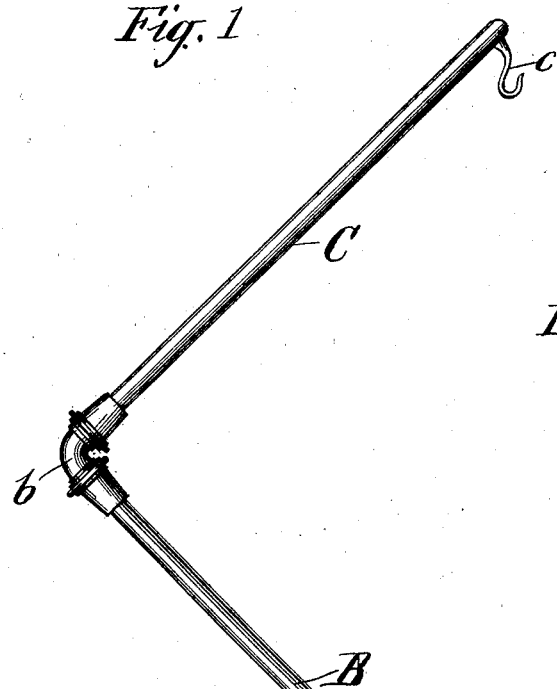
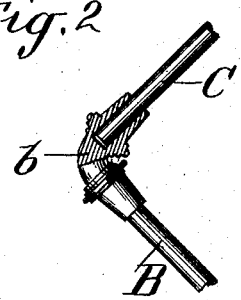
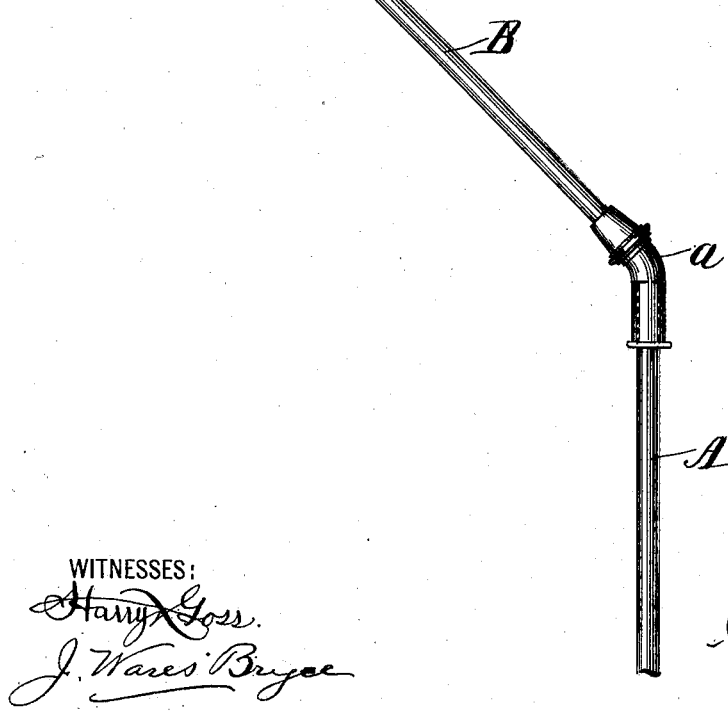
WITNESSES:
Harry Goss.
J. Wares Bryce
INVENTOR
E. A. Hawthorne

UNITED STATES PATENT OFFICE.

ELLSWORTH A. HAWTHORNE, OF MONTCLAIR, NEW JERSEY.

SUPPORT FOR PHONOGRAPHS, GRAPHOPHONES, &c.

SPECIFICATION forming part of Letters Patent No. 719,662, dated February 3, 1903.

Application filed February 8, 1901. Renewed December 27, 1902. Serial No. 136,867. (No model.)

*To all whom it may concern:*

Be it known that I, ELLSWORTH A. HAWTHORNE, a citizen of the United States, and a resident of the town of Montclair, State of New Jersey, have invented new and useful Improvements in Horn-Stands for Phonographs, Graphophones, and Similar Machines, of which the following is a specification.

My invention relates to a support for the horn of a phonograph, graphophone, or similar machine.

I will describe a construction embodying my invention and then point out the novel features thereof in my claim.

In the accompanying drawings, Figure 1 is a side view of my improved support, and Fig. 2 a part-sectional view of one of the elbow connections.

A designates a post or standard which in practice will be seated in any suitable form of support by which it may be adjusted vertically to any desired height and held in its adjusted position, as by a set-screw or other suitable means.

The upper part of the support is formed by the rods B and C, held rigidly together by the coupling-elbow $b$ in the manner shown, the lower end of the rod B being fitted into the coupling-piece $a$, which is seated over the top of the post A. Depending from the upper end of the rod C is a hook $c$ to receive a ring attached to the horn. The recesses in the couplings $a$ and $b$ may be knurled or screw-threaded, or they may be plain, as shown in Fig. 2. The couplings $a$ and $b$ may be of any suitable form, the essential feature being that the rods constituting the support shall be easily attached to and detached from the couplings.

The above-described horn-support possesses many advantages over the forms now in use in that the parts may be readily assembled and dismantled, it requiring but a moment to connect or disconnect the rods B and C with the couplings. When packed for shipment, the rods B and C may be laid alongside the post A or its inclosing support, thus effecting an economy in the space occupied. The parts of the support will be preferably made of metal.

Instead of the two rods the upper part of the support may consist of three or four members connected by couplings, the essential feature being that the members shall be readily detachable and separable one from the other.

What I claim, and desire to secure by Letters Patent, is—

A support for the horn of a phonograph, graphophone or similar machine, consisting of a supporting-post, a plurality of rods, and detachable couplings having sockets at an angle to each other for receiving the said post and rods, whereby the rods may be secured for use in such way as to properly support the horn, substantially as described.

In testimony whereof I have signed my name to this specification in the presence of two subscribing witnesses.

ELLSWORTH A. HAWTHORNE.

Witnesses:
L. H. POTTER,
R. H. MORRIS.